US007607129B2

(12) United States Patent
Rosu et al.

(10) Patent No.: US 7,607,129 B2
(45) Date of Patent: Oct. 20, 2009

(54) METHOD AND APPARATUS FOR USING VIRTUAL MACHINE TECHNOLOGY FOR MANAGING PARALLEL COMMUNICATING APPLICATIONS

(75) Inventors: Marcel-Catalin Rosu, Ossining, NY (US); Debanjan Saha, Mohegan Lake, NY (US); Sambit Sahu, Hopewell Junction, NY (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1099 days.

(21) Appl. No.: 11/100,565

(22) Filed: Apr. 7, 2005

(65) Prior Publication Data
US 2006/0230407 A1 Oct. 12, 2006

(51) Int. Cl.
G06F 9/455 (2006.01)
G06F 9/46 (2006.01)
(52) U.S. Cl. .......................................... 718/1; 718/105
(58) Field of Classification Search .................... 718/1, 718/100, 104, 105; 709/201, 202, 203, 223, 709/224, 225, 226
See application file for complete search history.

(56) References Cited

U.S. PATENT DOCUMENTS 5,257,386 A * 10/1993 Saito ........................... 712/225
6,581,088 B1 * 6/2003 Jacobs et al. ................. 718/105
6,802,062 B1 * 10/2004 Oyamada et al. .............. 718/1
7,203,944 B1 * 4/2007 van Rietschote et al. ..... 718/104
7,257,811 B2 * 8/2007 Hunt et al. ...................... 718/1
7,383,405 B2 * 6/2008 Vega et al. ................... 711/162
7,484,208 B1 * 1/2009 Nelson .......................... 718/1
7,526,515 B2 * 4/2009 Broussard et al. ........... 707/205
2005/0060590 A1 * 3/2005 Bradley et al. .............. 713/320
2005/0160424 A1 * 7/2005 Broussard et al. .............. 718/1
2005/0251802 A1 * 11/2005 Bozek et al. ................... 718/1
2006/0005189 A1 * 1/2006 Vega et al. ..................... 718/1
2006/0069761 A1 * 3/2006 Singh et al. .................. 709/222
2006/0195715 A1 * 8/2006 Herington ...................... 714/4
2007/0130566 A1 * 6/2007 van Rietschote et al. ....... 718/1
2007/0169121 A1 * 7/2007 Hunt et al. ...................... 718/1

OTHER PUBLICATIONS

Fu et al. "Migration Decision For Hybrid Mobility In Reconfigurable Distributed Virtual Machines", 2004 IEEE, 8 pages.*
Lin et al. "User-Driven Scheduling Of Interactive Virtual Machines", 2004 IEEE, 8 pages.*
Deng et al. "Parallel Volume Rendering On Virtual Machines", 2000 IEEE, 4 pages.*

* cited by examiner

Primary Examiner—Van H Nguyen
(74) Attorney, Agent, or Firm—Vazken A. Alexanian

(57) ABSTRACT

A method (and system) for managing a distributed-memory parallel application running on multiple servers, includes dynamically moving a plurality of executable program components, where each of the plurality of executable program components are running on one of a plurality of virtual machines, using migration of the virtual machines between physical servers. The load balancing is operated based on a workload of each of the virtual machines and servers, where a virtual machine, or a plurality of virtual machines, are transferred to balance the workload between each of the servers.

1 Claim, 6 Drawing Sheets

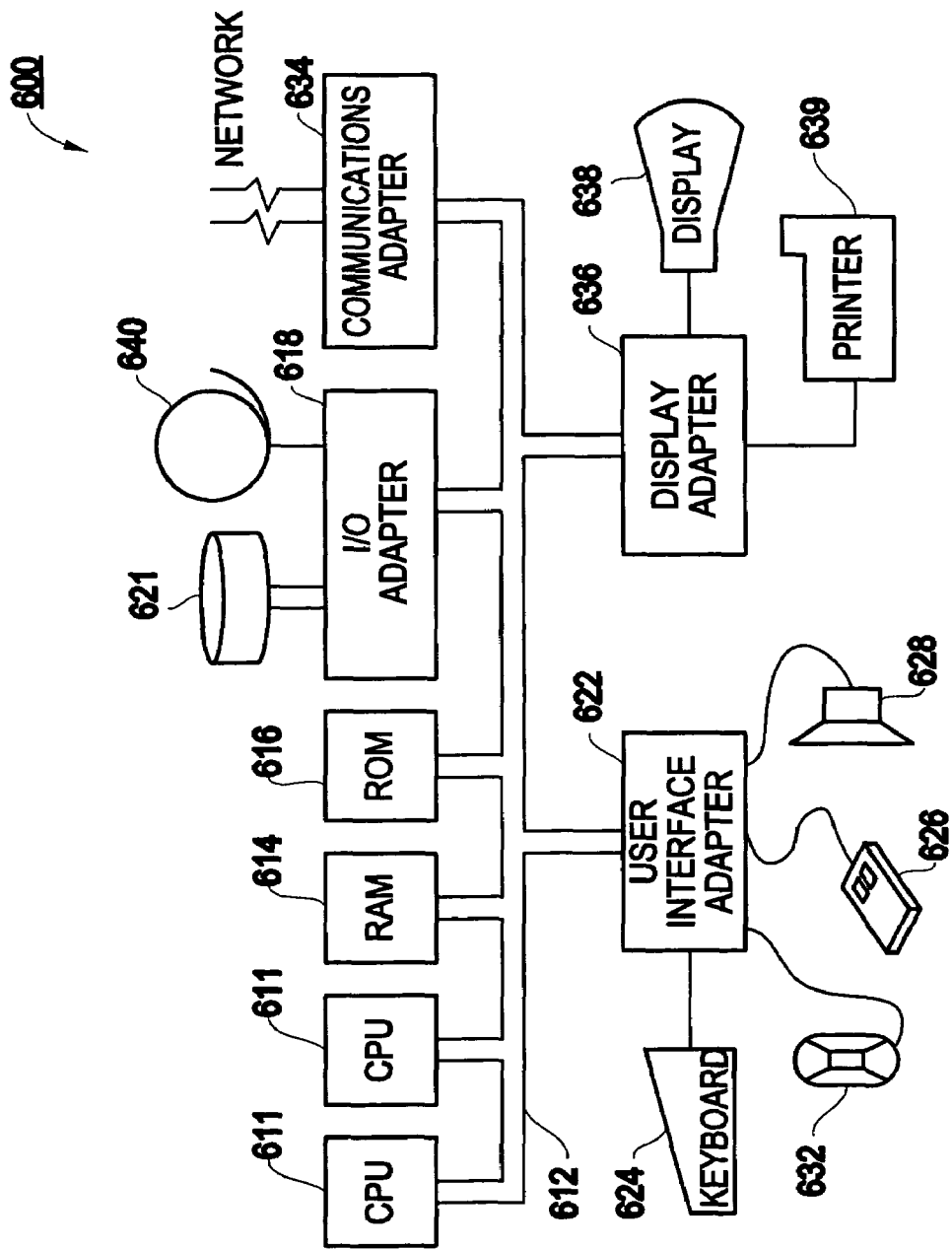

METHOD AND APPARATUS FOR USING VIRTUAL MACHINE TECHNOLOGY FOR MANAGING PARALLEL COMMUNICATING APPLICATIONS

BACKGROUND OF THE INVENTION

1. Field of the Invention

The present invention generally relates to computer software, and more particularly to the design and development of application management software for managing parallel communicating applications.

2. Description of the Related Art

Parallel applications running on distributed memory platforms, such as clusters of servers, typically divide an application state among compute nodes, and execute the nodes in alternate rounds of computation and communication. In these configurations, each node performs roughly the same computation, and the application state is partitioned among nodes in a way that balances the computation load and minimizes inter-node communication. For some problem domains, a static partitioning achieves these goals.

However, in many situations, using a static partitioning is a poor choice, as significant fractions of the computational load can shift between cluster nodes. These behaviors are very difficult to predict before the computation starts and the typical solution is to address such problems at run-time, by monitoring and rebalancing the load between nodes periodically.

To implement this solution, each parallel application is designed to monitor resource usage, and decide when rebalancing is beneficial. Then, the application computes the new partitioning and exchanges portions of the application state with other nodes. Although this solution could yield optimal load balancing and minimum execution times, its implementation requires substantial effort.

The benefits of executing a parallel application are often hard to determine, and hence the effort to architect applications to handle automatic repartitioning and state exchange is not always worthwhile. For these situations, a suboptimal solution which provides load balancing without increasing the complexity of the application is often desired.

For example, online gaming is an application class that could potentially benefit from automated load balancing and repartitioning as long as adding such functionality is not overly burdensome for the developer.

In most online games, a central server maintains the global state of the game world and periodically distributes updates to the clients as the game play proceeds. Players (i.e., clients) communicate their own local state to the server, either periodically or whenever it changes. Popular titles, with a large number of simultaneous clients (e.g., massively multiplayer games), cannot be hosted by a single central server. In these situations, the server-side game application is designed to run on multiple servers.

The ability to repartition the game world dynamically, i.e., to expand to more servers, or shrink to fewer servers, is particularly useful for a number of reasons. For example, the popularity of a title is hard to predict, the number of simultaneous players varies widely during the day, or servers can become overloaded due to player movements into a part of the game world that is hosted locally on a particular server.

Although beneficial from a resource utilization perspective, dynamic world partitioning adds significant complexity to the design and implementation of online games, therefore increasing their time-to-market and development costs. Other applications that are designed to run on multiple nodes and communicate their state as necessary would also stand to benefit from dynamically partitioning their state among nodes. However, dynamically partitioning a game world, a large matrix or a weather map is a difficult task which requires a substantial software engineering and testing effort.

Virtual machines may be used for dynamically partitioning a parallel application running on multiple servers. A virtual machine is a software abstraction that is designed to look and to act like a computer system's hardware. A modern computer system is composed of layers, beginning with the hardware and including layers of an operating system and application programs running on top of the operating system. Virtualization software abstracts virtual machines by interposing a software layer at various places in a system.

Examples of virtualization layers include hardware level virtualization layers, operating system level virtualization layers and high-level language virtual machines. In the case of a hardware level layer, the virtualization layer is positioned directly on top of the hardware of the computer system and acts as hardware for the system. All of the software written for the actual hardware will run on the virtual machine. Operating system virtualization layers are positioned between the operating system and the application programs that are run on the operating system. The virtual machine, in this case, runs applications that are written for the operating system. In the case of high-level language virtual machines, the layer is positioned as an application program on top of the operating system.

Virtual machines provide several attributes that make them attractive for use in parallel applications. Virtual machines provide a compatible abstraction so that all software written for the computer system will run on the virtual machine. Also, the virtual machine abstraction can isolate the software running in the virtual machine from other virtual machines and real machines. Finally, the benefits of using a virtual machine far outweigh the overhead created by adding a layer of software to the computer system.

Commercial virtual machine technology, such as VMWare, provides a limited ability to migrate virtual machines. Typically, only the migration mechanisms are provided; the policies governing virtual machine migration are designed and implemented separately, in the data center management software. Previous work related to virtual machine migration is motivated by the desire to reduce the number of physical servers used in the data center. As a result, related applications, which were previously run on an individual server, are now assigned to a virtual machine. In these configurations, there is little communication between virtual machines and these applications were developed separately from the development of virtual machine migration mechanisms and policies. In contrast, in this invention, using virtual machine migration is considered during the design and development stages of the parallel applications considered as a tool for reducing the software engineering effort and, as a result, the financial risks associated with developing, testing and deploying these applications.

SUMMARY OF THE INVENTION

In view of the foregoing and other exemplary problems, drawbacks, and disadvantages of the conventional methods and structures, an exemplary feature of the present invention is to provide a method (and system) for using virtual machine technology for managing parallel communicating applications.

In a first exemplary aspect of the present invention, a method (and system) for managing an application running on multiple servers, includes dynamically moving a plurality of executable program components, where the plurality of executable program components are running on one of a plurality of virtual machines, wherein the dynamically moving the executable program components uses migration of the virtual machines between physical servers. Movement of the virtual machines between physical machines can be performed for a number of reasons, including load balancing, improving inter-node communication latency, enabling server maintenance, or implementing particular resource allocation policies. Load balancing, for example, is operated based on a workload of each of the virtual machines and servers, where a virtual machine, or a plurality of virtual machines, are transferred from a first server to a second server to balance the workload between each of the servers.

In a second exemplary aspect of the present invention, a computer system for managing a distributed-memory parallel application running on multiple servers, includes means for dynamically moving a plurality of executable program components, where each of the plurality of executable program components is running on one of a plurality of virtual machines, using migration of the virtual machines between physical servers.

In a third exemplary aspect of the present invention, a system for managing a distributed-memory parallel application running on multiple servers, includes an application design unit that designs an application, an application partition unit that partitions the application into at a plurality of executable program components, an assignment unit that assigns each of the plurality of executable program components into one of a plurality of virtual machines, a virtual machine monitoring unit that monitors a workload of the plurality of virtual machines, and a moving unit for shifting a first virtual machine of the plurality of virtual machines from a first physical server to a second physical server.

In a fourth exemplary aspect of the present invention, a signal-bearing medium tangibly embodying a program of machine readable instructions executable by a digital processing apparatus to perform a method of managing a distributed-memory parallel application running on multiple servers, where the method includes dynamically moving a plurality of executable programs, where the plurality of executable program components is running on one of a plurality of virtual machines, using migration of the virtual machines between physical servers.

In a fifth exemplary aspect of the present invention, a method for deploying computing infrastructure, includes integrating computer readable code into a computing system, wherein the computer readable code in combination with the computing system is capable of performing a method of managing a distributed-memory parallel application running on multiple servers, where the method of managing an application running on multiple servers, includes dynamically moving a plurality of executable program components, the plurality of executable program components are running on one of a plurality of virtual machines, using migration of the virtual machines between physical servers.

In a sixth exemplary aspect of the present invention, a method (and system) for managing a multiple user game running on multiple servers, includes dynamically moving a plurality of executable program components, where the plurality of executable program components is running on one of a plurality of virtual machines, using migration of the virtual machines between physical servers.

In a seventh exemplary aspect of the present invention, a system for managing a distributed-memory parallel application running on multiple servers, includes a plurality of servers, a plurality of virtual machines, each virtual machine operating a partition of the application, a virtual machine monitoring and migrating unit for monitoring an operation of each of the plurality of virtual machines and shifting the virtual machines between the plurality of servers to balance the workload.

Certain exemplary embodiments of the present invention propose migrating a computation state between machines, such as techniques for virtual machine migration, for dynamically load balancing parallel applications running on clusters of servers, without increasing the development complexity and cost of these applications. Initially, the application is divided into smaller communicating executable program components (partitions), so that there is at least one partition for each machine in a cluster of machines.

When using virtual machine migration, each executable program component is run in a separate virtual machine. As the workload on each server varies, virtual machines are migrated between servers using a virtual machine migration technique. Virtual machines on overloaded machines are moved to more powerful servers, or virtual machines are gathered on underutilized servers. Other techniques for the migration of computation include process migration, such as described in "The V Distribution Operating System", CACM, March 1988. Process migration stands for a collection of techniques for moving an application from one operating system image to another. Typically, the two operating system images run on different physical servers.

This solution can be applied, for example, to massively multiplayer online games with partitioned worlds. When the game is started or restarted, the game world is divided in a number of "realms" and each of the realms is run in a separate virtual machine. For load balancing, the virtual machines corresponding to game world partitions are migrated seamlessly between servers using functionality available as part of the virtual machine technology. The migration takes into consideration transitory and steady state performance goals.

As the popularity of these games is hard to predict during development, exemplary aspects of the inventive method and system lowers development costs and reduces risks substantially, while providing reasonable load balancing functionality between application servers.

Another advantage of the invention is that programmers of parallel communicating applications can use the native communication support on the underlying platform, without the need to program specialized APIs for load balancing and communication. The virtual machine technology handles migration, load-balancing, and communication between the virtual machines, transparently (e.g., transparently to the developer).

Furthermore, using the invention for load balancing helps with the design of the application-level monitoring and load balancing modules. For many applications, the present invention may provide a suboptimal solution. However, using the invention together with static partitioning of the problem space helps collect the runtime information necessary for designing an optimal, application-level solution. Static partitioning is an important step in the design and development of the application. As result, using the present invention does not result in unnecessary development costs for those applications deemed important or successful enough to justify an optimal, application-level load balancing solution.

Thus, the invention provides a method (and system) for dynamic load balancing processing for parallel communicating applications without increasing the development complexity and cost of these applications.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 6 illustrates a block diagram of the environment and configuration of an exemplary system 600 for incorporating the present invention; and FIG. 7 illustrates a storage medium 700 for storing steps of the program for scaling a binary image according to the present invention.

DETAILED DESCRIPTION OF EXEMPLARY EMBODIMENTS OF THE INVENTION

Figure 1:
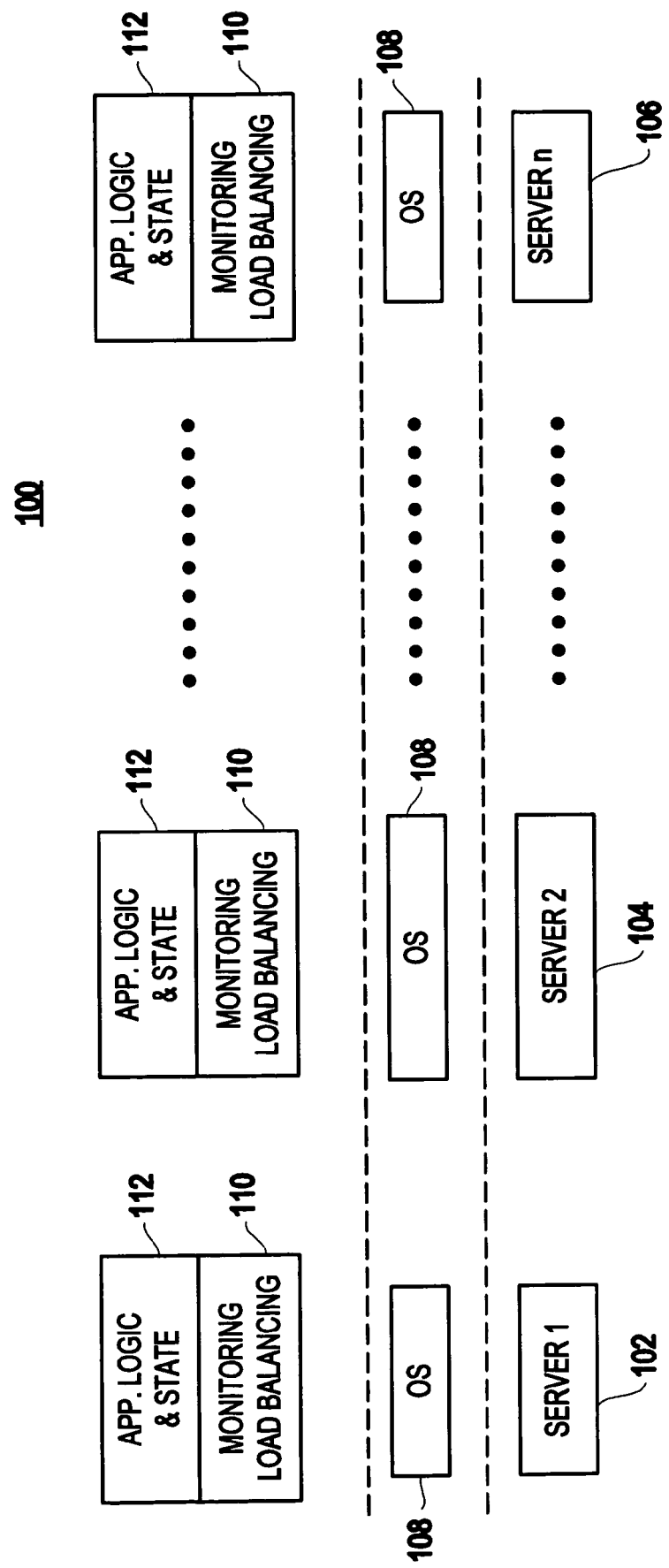
FIG. 1 illustrates a parallel application 100 which includes code for load monitoring and load balancing of the application state.

Referring now to the drawings, and more particularly to FIGS. 1-7, there are shown exemplary embodiments of the method and structures according to the present invention.

In the exemplary embodiment, an application is designed to run on multiple servers (nodes), with the ability for application instances (or partitions) to exchange data or state with other servers as necessary. This communication capability may be developed using any native facility provided by the target platform that the application developer wishes, such as TCP or UDP sockets, or parallel communication middleware (PVM, MPI). Each partition of the problem state runs in a separate virtual machine. Initially, all partitions could share a common server or be distributed randomly between the servers in the cluster.

The movement of virtual machines and their associated application partitions may be triggered by various policy goals, including balancing server load, reducing latency between communicating partitions, or providing additional resources to certain applications. In the case of load balancing, for example, as the load of a particular partition increases, the virtual machine hosting it is migrated to another server with more available resources, or the available capacity on its current server is increased by migrating other VMs to alternate servers. As the load in a partition decreases or the current server is needed for another task, the partition is migrated to another, possibly shared, server with enough available resources. The migration is handled by system code which is part of the virtual machine technology selected for the parallel application. Repartitioning may still be required, but less frequently, and therefore, would be performed during application checkpoints (or scheduled downtimes), which allows the virtual machines to be migrated without affecting the application and without being noticed by the users of the application.

FIG. 1 depicts a conventional parallel application 100 that includes code for load monitoring (110) and load balancing of a problem state (application) (112). The parallel application 100 includes at least a first server 102 and a second server 104, which are used in a parallel application. The parallel application will typically include a plurality of servers, represented by server n 106. There is no limit to the number of servers included in the parallel application 100. The servers may be physical computer hardware such as desktop computers.

Each of the servers has an operating system 108, running on the server. The operating systems 108 run the application logic and application state on each of the servers. The application logic and state is statically partitioned into a plurality of application logic and state executable programs (partitions) 112. Each executable program is run on a single server. The servers also include a monitoring and load balancing unit 110 for monitoring the workload of the executable programs 112 on the servers. Each of the servers 102, 104, 106 is in parallel communication with one another.

Conventional parallel applications include a module for load monitoring and for repartitioning the problem state every time it is deemed necessary. Such a solution achieves the best load balancing results because the load monitoring module can take advantage of application-specific performance measures, such as response times for online game servers. Similarly, load/state migration policies implemented at the application level can use application-specific metrics such as the expected duration of a planned state migration, the maximum allowable time interval for a state migration, and application-specific techniques for optimizing the state migration process. It is significant that the present invention is dealing with a parallel application (i.e., with components running on separate nodes and communicating with each other, and with the external world).

Figure 2:
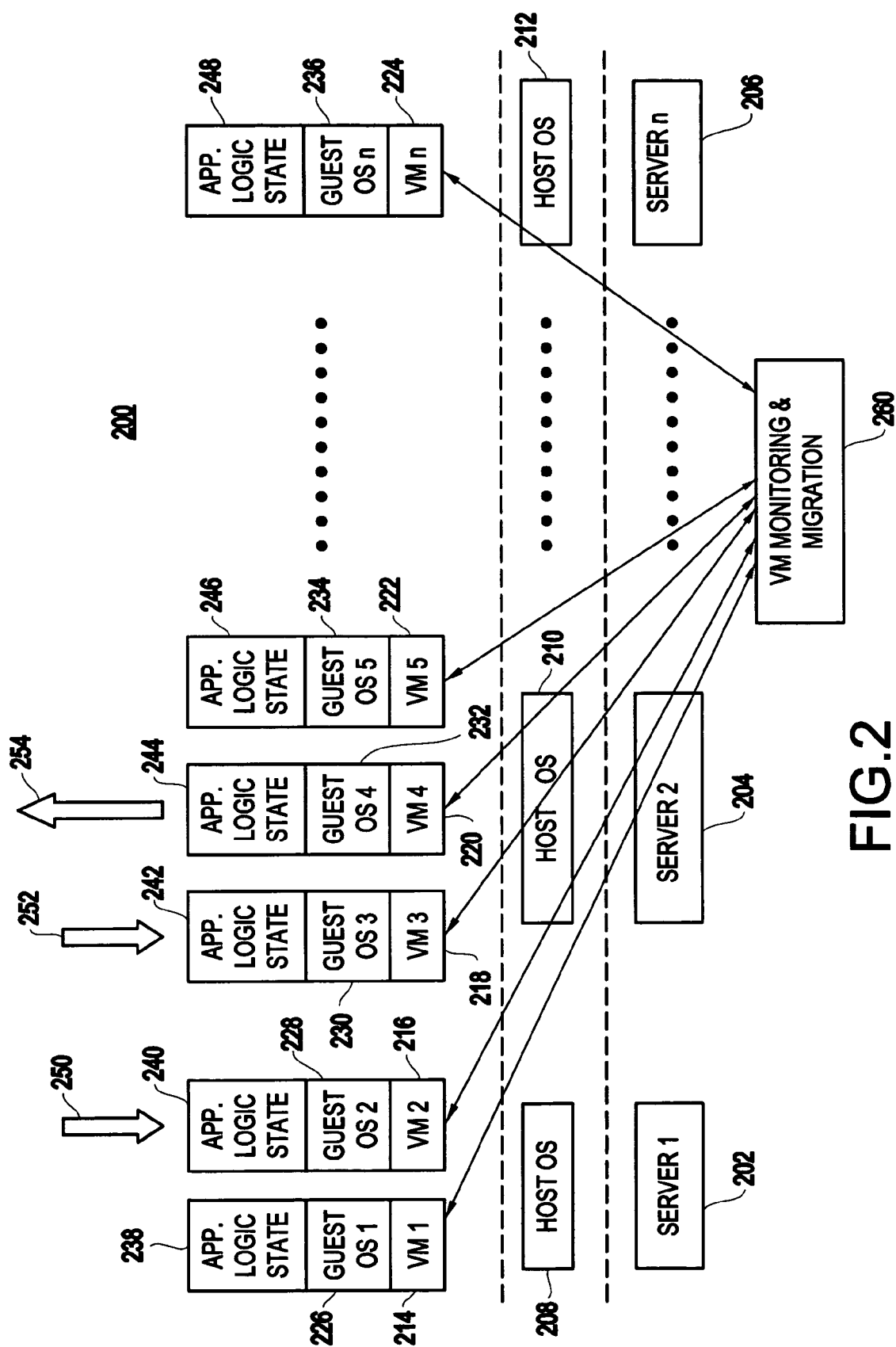
FIG. 2 illustrates a parallel application 200 with the application partitioned into executable programs, with each executable program running in a separate virtual machine.

FIG. 2 depicts a parallel application 200 using virtual machine technology according to an exemplary embodiment of the present invention. As in the conventional parallel application arrangement 100, depicted in FIG. 1, the parallel application 200 according to the exemplary embodiment of the present invention includes at least a first server 202 and a second server 204, but may include any number of a plurality of servers, represented by server n 206. Each of the servers, 202, 204, 206 includes a host operating system 208, 210, 212 respectively. The host operating system 208, 210, 212 may include any typical operating system software.

In the typical parallel application 100, each operating system 108 runs a single application executable program 112 on each of the servers 102, 104, 106. In the parallel application 200 of the exemplary embodiment, each of the servers 202, 204, 206 includes at least one virtual machine. According to the exemplary embodiment, the application 200 is partitioned into at least two executable programs. Each of the executable programs is run on a separate virtual machine.

Each server includes at least one virtual machine. For example, as shown in FIG. 2, server 1 202 has a host operating system 208. The host operating system 208 runs a first virtual machine 214 and a second virtual machine 216. Server 2 204 has a host operating system 210, which runs a third virtual machine 218, a fourth virtual machine 220 and a fifth virtual machine 222.

As discussed above, the virtual machines are software programs that act as hardware, such as a server. Each of the virtual machines 214, 216, 218, 220, 222 runs a guest operating system 226, 228, 230, 232, 234, respectively. For example, a server 202 may run a host operating system 208, such as Microsoft Windows. Each of the virtual machines 214, 216 running on the host operating system 208, and acting as a hardware server, runs a separate guest operating system, such as Microsoft Windows®. Therefore, server 1 202 will actually be running multiple, separate Microsoft Windows® operating systems.

Each of the guest operating systems then controls a separate application executable program 238, 240. Therefore, each executable program (partition) of the application 200 is controlled by a separate guest operating system on a separate virtual machine on a server.

A virtual machine monitoring and migration unit 260 is provided to monitor and to balance the workload of the servers. The monitoring and migrating unit 260 may be provided on one of the servers in the parallel application 200 or may be provided on a separate, independent machine.

For example, each of the virtual machines has a workload that will vary over time. The arrows in FIG. 2 represent the workload of the second virtual machine 216, the third virtual machine 218 and the fourth virtual machine 220. The workloads for the second virtual machine 216 and the third virtual machine 218 are currently decreasing, as depicted by the downward pointing arrows 250 and 252, respectively. The workload of the fourth virtual machine 220, however, is currently increasing, as indicated by the upward pointing arrow 254.

The monitoring and migrating unit 260 monitors the workload by communicating directly with each of the virtual machines. In the exemplary embodiment depicted in FIG. 2, there is currently an imbalance between the workloads of server 1 202 and server 2 204. Once this load imbalance is detected, the monitoring and migration unit 260 will shift individual virtual machines from an "overworked" server to an "underworked" server to balance the workload.

Figure 3:
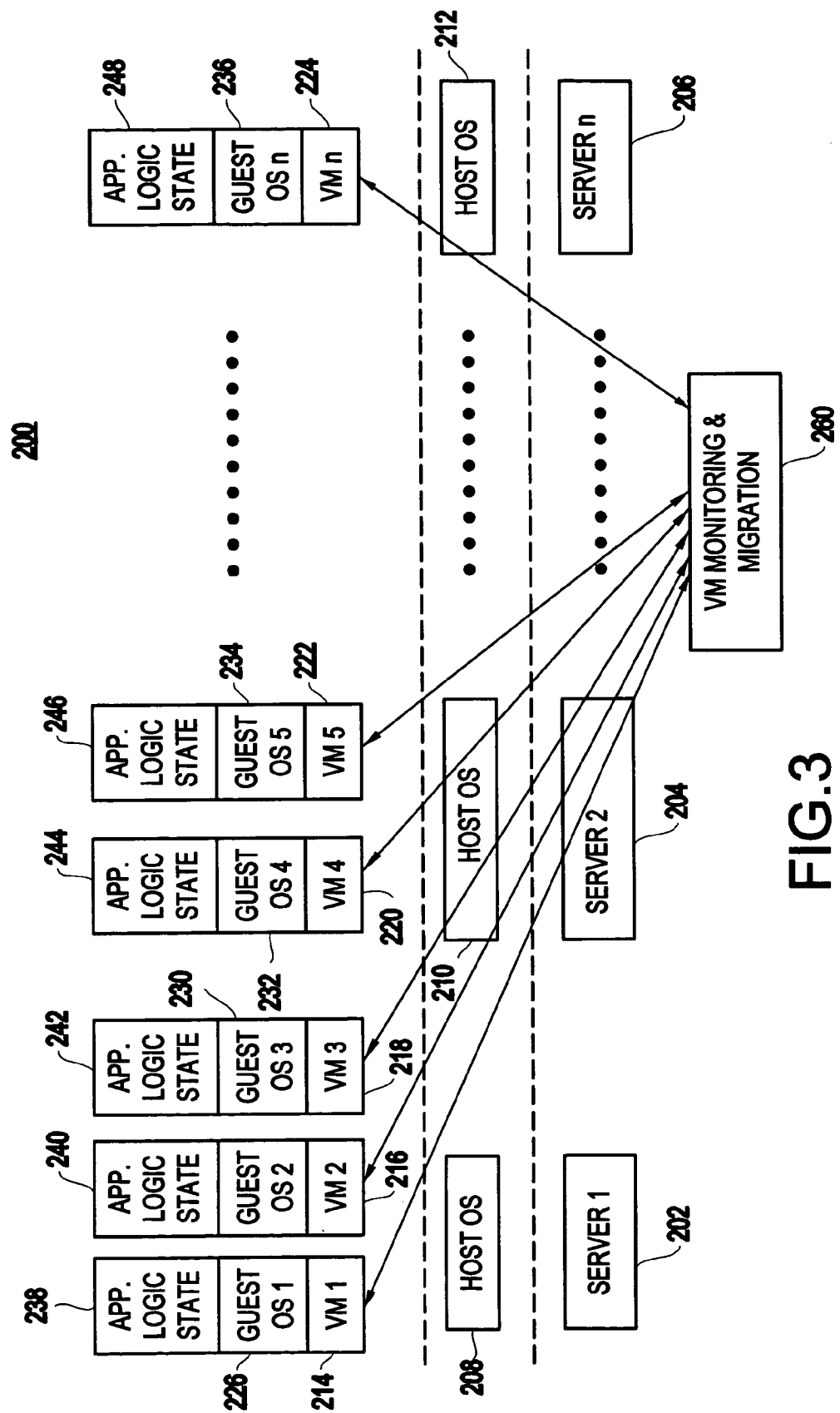
FIG. 3 illustrates the parallel application 200 of FIG. 2 after the workload is balanced.

FIG. 3 illustrates the parallel application 200 depicted in FIG. 2 after the workload has been balanced. As depicted in FIG. 3, the virtual machine monitoring and migration unit 260 shifted the third virtual machine 218 from server 2 204 to server 1 202. The workload is now balanced between each of the servers.

Figure 4:
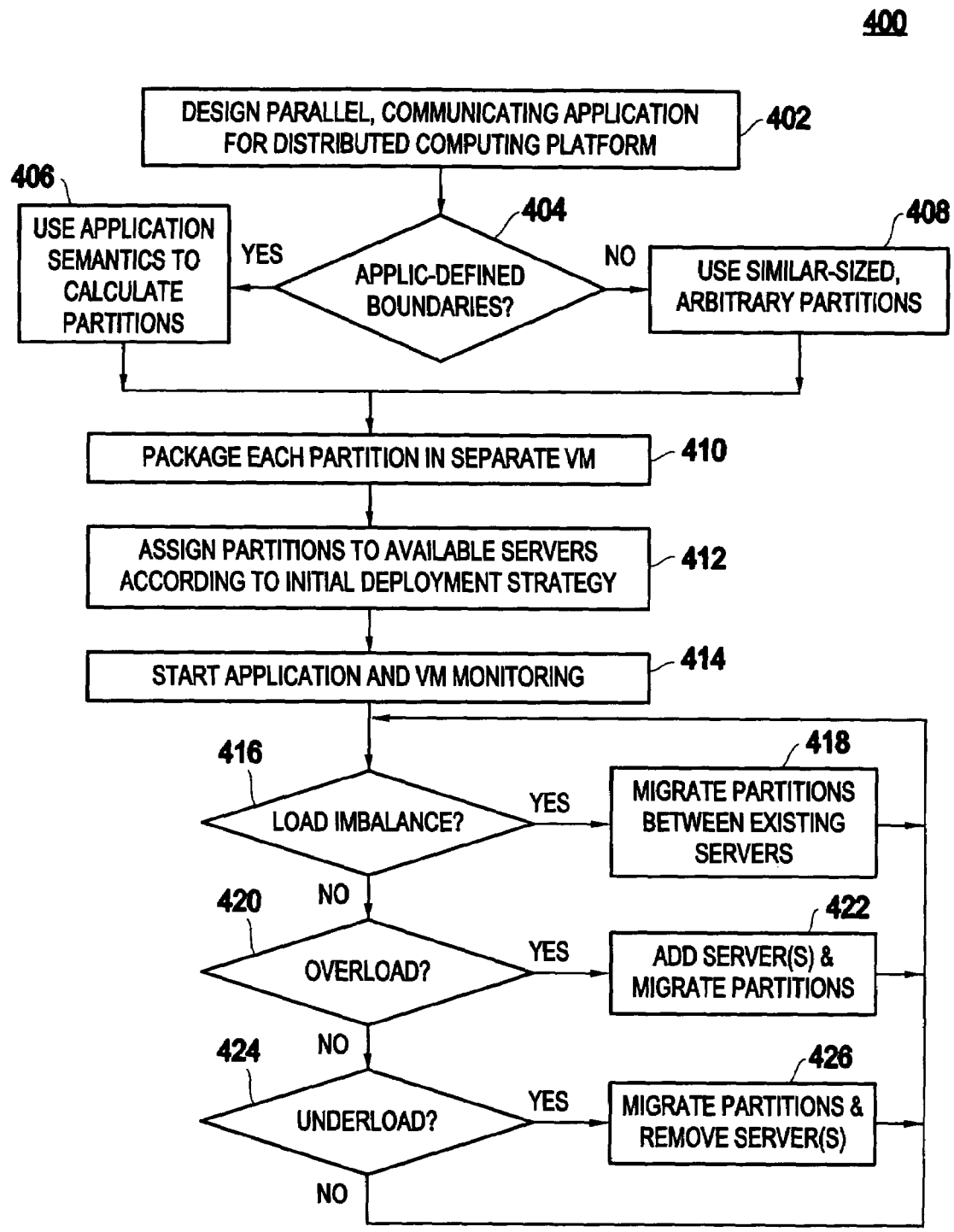
FIG. 4 is a flow diagram illustrating a method 400 for designing and developing applications running on multiple servers.

FIG. 4 illustrates a flow diagram for a method of designing and developing an application running on multiple servers according to an exemplary embodiment of the present invention.

First, the parallel communicating application is designed (step 402) according to the problem being solved. Once the application is designed, it is partitioned into a plurality of executable programs (step 404). The number of executable programs will vary depending on the size and complexity of the application. Thus, if the application is relatively large and/or complex, then the number of executable programs will be large. The application can be partitioned using different techniques based on whether or not the application has defined partitioning boundaries (step 404). For purposes of the present application, "defined partitioning boundaries" application-specific boundaries for partitioning the application state that minimize communication between the partitions, such as building walls or rivers in the state of an online game application.

If there are no defined boundaries, then the Application is partitioned into similar-sized, uniform (or substantially uniform), arbitrary partitions (step 408). For example, a very large, highly populated battle field in the map of an online war game is divided into squares/areas of equal size.

If, however, the application includes defined partition boundaries, then application semantics are used to calculate the partitions (step 406). For example, Application semantics could be used to partition the map of an online game along walls and in a way that minimizes the number of access points (doors, windows, etc.) between the rooms in separate partitions. This is referred to as "smart" partitioning. The "smart" partitioning allows the application to be partitioned in a manner that will minimize the communication between the virtual machines and will allow for the virtual machines to be shifted more easily. It is advantageous to minimize the communication so as to allow a larger fraction of the server resources to be used for the application logic rather than communication with other nodes. The "smart" partitioning is based on the projected communication between virtual machines.

Once the application is partitioned into a plurality of executable programs, each partition is packaged into a separate virtual machine (step 410). The step of "packaging" is performed by an application configuration module which creates a partition for each virtual machine. The virtual machines are then assigned to available servers according to an initial deployment strategy (step 412). All of the virtual machines are assigned because the it is preferable for the application to have all of the partitions active, i.e., running. An example of initial deployment is starting all of the virtual machines on the same physical server. A more appropriate strategy will be to allocate a reasonable number of physical servers for the expected load and assign the virtual machines to servers in a way that is expected to reduce inter-server communication (i.e., have virtual machines that communicate often with each other hosted on the same physical machine, if the load of the physical machine permits).

Once the virtual machines are assigned to the servers, the application is started, and the virtual machine monitoring and migration unit begins to monitor the workload of the virtual machines (step 414). As known, the workload is monitored by measuring application-independent server characteristics, such as idle time or swapping rate. The monitoring unit monitors the virtual machines to determine if there is an imbalance in the workload between the servers, an overload in the servers, or an underload in the servers.

The monitoring unit first determines if there is a load imbalance between the workload on each of the servers (step 416). If so, then virtual machines are migrated between the existing servers to balance the load (step 418). Once the workload is balanced between the existing servers, the process is reiterated to once again monitor the workload of the servers.

If there is no imbalance in the workload of the servers, then the monitoring unit determines if there is an overload in the system (step 420). An overload occurs when all of the existing servers are working at maximum capacity and the virtual machines cannot be migrated to one of the existing servers. If an overload is detected by the monitoring unit, then a new server is added to the system and virtual machines from the existing servers are migrated to the newly created server (step 422). Once the new server is created and the virtual machines are migrated to that server, the process is reiterated to once again monitor the workload of the servers.

If there is no overload detected in the servers, then the monitoring unit then determines if there is an underload in the system (step 424). An underload occurs when the amount of activity in the application is reduced to a point that there is a larger number of active servers than necessary. If an underload is detected by the monitoring unit, the virtual machines are migrated and one or more of the existing serves are removed (step 426), and may be used on a separate application or the server may be turned off (e.g., powered-down). Once the virtual machines are migrated and the excess servers are removed, the process is reiterated to once again monitor the workload of the servers.

Figure 5:
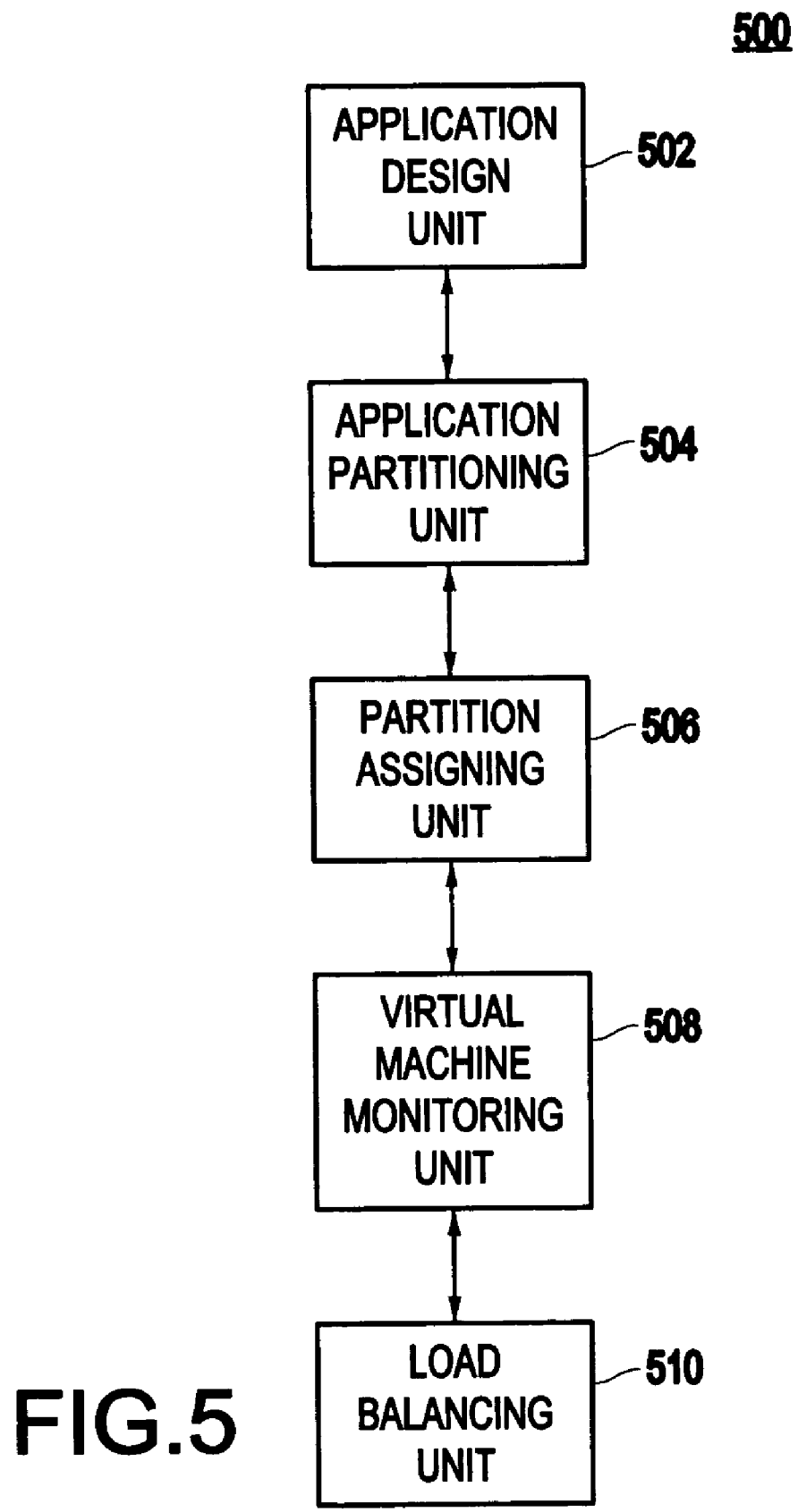
FIG. 5 depicts a block diagram of a system 500 for designing and developing applications running on multiple servers.

FIG. 5 depicts a system 500 for designing and developing applications running on multiple servers. The system 500 includes an application design unit 502, an application partitioning unit 504, a partition assigning unit 506, a virtual machine monitoring unit 508 and a load balancing unit 510.

The application design unit 502 designs and configures the parameters of the application. For example, some of the application parameters may include data files representing game maps and characters, for an online game application. Once the application is configured, the application partitioning unit 504 partitions the application into a plurality of executable programs. The application is partitioned either arbitrarily or based on application semantics, as discussed above.

The partition assigning unit 506 then packages each of the executable programs into a separate virtual machine, and then assigns the executable programs to available servers based on an initial deployment strategy, as discussed above. The virtual machine monitoring unit 508 monitors the workload of each of the servers. The load balancing unit 510 balances the workload of the servers by shifting virtual machines from an overloaded server to another server having a sufficient workload capacity.

FIG. 6 shows a typical hardware configuration of an information handling/computer system in accordance with the invention that preferably has at least one processor or central processing unit (CPU) 611. The CPUs 611 are interconnected via a system bus 612 to a random access memory (RAM) 614, read-only memory (ROM) 616, input/output adapter (I/O) 618 (for connecting peripheral devices such as disk units 621 and tape drives 640 to the bus 612), user interface adapter 622 (for connecting a keyboard 624, mouse 626, speaker 628, microphone 632, and/or other user interface devices to the bus 612), communication adapter 634 (for connecting an information handling system to a data processing network, the Internet, an Intranet, a personal area network (PAN), etc.), and a display adapter 636 for connecting the bus 612 to a display device 638 and/or printer 639 (e.g., a digital printer or the like).

As shown in FIG. 6, in addition to the hardware and process environment described above, a different aspect of the invention includes a computer implemented method of performing the inventive method. As an example, this method may be implemented in the particular hardware environment discussed above.

Such a method may be implemented, for example, by operating a computer, as embodied by a digital data processing apparatus to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 611 and hardware above, to perform the method of the present invention.

This signal-bearing media may include, for example, a RAM (not shown) contained with the CPU 611, as represented by the fast-access storage, for example. Alternatively, the instructions may be contained in another signal-bearing media, such as a magnetic data storage diskette or CD disk 700 (FIG. 7), directly or indirectly accessible by the CPU 611.

Whether contained in the diskette 700, the computer/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method of managing a distributed-memory parallel application running on multiple physical servers, comprising:

dynamically moving a plurality of executable program components, said plurality of executable program components running on one of a plurality of virtual machines, said moving using migration of the virtual machines between physical servers;

dynamically load balancing at an application level to work in conjunction with said moving a plurality of executable program components;

partitioning the distributed-memory parallel application among specific ones of said executable program components based on application-defined partition boundaries;

packaging said executable program components into one of said plurality of virtual machines;

assigning each of said plurality of virtual machines to one of the physical servers according to a deployment strategy; and monitoring an operation of each virtual machine of said plurality of virtual machines, said monitoring comprising determining if there is an imbalance in a workload of each of the physical servers, determining whether application performance can be improved, determining whether a communication latency between virtual machines is reduced, determining whether current virtual machine assignment violates administrative policy, wherein if there is an imbalance in said workload of each of the physical servers, at least one of said virtual machines is migrated from a first physical server to a second physical server to balance the workload, wherein if at least one of the physical servers is overloaded, a new physical server is added to the multiple physical servers, and at least one of said virtual machines, from an overloaded physical server, is migrated to said new physical server, wherein if at least one of the physical servers is underloaded, at least one of said virtual machines is migrated and at least one of the physical servers is removed, and wherein said at least one of the physical servers that is removed is allocated to another application, said another application comprising a distributed-memory application comprising a plurality of executable program components running on one of a plurality of virtual machines.

* * * * *